(12) United States Patent
Baskent et al.

(10) Patent No.: US 8,359,283 B2
(45) Date of Patent: Jan. 22, 2013

(54) GENETIC ALGORITHMS WITH ROBUST RANK ESTIMATION FOR HEARING ASSISTANCE DEVICES

(75) Inventors: Deniz Baskent, Berkeley, CA (US); Eric Durant, Greenfield, WI (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 598 days.

(21) Appl. No.: 12/550,768

(22) Filed: Aug. 31, 2009

(65) Prior Publication Data
US 2011/0055120 A1 Mar. 3, 2011

(51) Int. Cl.
*G06F 15/18* (2006.01)
*G06N 3/00* (2006.01)
*G06N 3/12* (2006.01)
*H04R 25/00* (2006.01)

(52) U.S. Cl. .......................................... 706/13; 381/312
(58) Field of Classification Search ............... 706/12–13
See application file for complete search history.

(56) References Cited

U.S. PATENT DOCUMENTS

| | | |
|---|---|---|
| 3,527,901 A | 9/1970 | Geib |
| 4,366,349 A | 12/1982 | Adelman |
| 4,396,806 A | 8/1983 | Anderson |
| 4,419,544 A | 12/1983 | Adelman |
| 4,471,171 A | 9/1984 | Kopke et al. |
| 4,471,490 A | 9/1984 | Bellafiore |
| 4,637,402 A | 1/1987 | Adelman |
| 4,697,242 A | 9/1987 | Holland et al. |
| 4,882,762 A | 11/1989 | Waldhauer |
| 5,226,086 A | 7/1993 | Platt |
| 5,390,254 A | 2/1995 | Adelman |
| 5,434,924 A | 7/1995 | Jampolsky |
| 5,502,769 A | 3/1996 | Gilbertson |
| 5,553,152 A | 9/1996 | Newton |

(Continued)

FOREIGN PATENT DOCUMENTS

DE 10053179 5/2001

(Continued)

OTHER PUBLICATIONS

Eisenberg, Laurie S. et al.; "Subjective Judgments of Speech Clarity Measured by Paired Comparisons and Category Rating"; 1997; Williams and Wilkins; Ear & Hearing; pp. 294-306.*

(Continued)

*Primary Examiner* — Jeffrey A Gaffin
*Assistant Examiner* — Stanley K Hill
(74) *Attorney, Agent, or Firm* — Schwegman, Lundberg & Woessner, P.A.

(57) ABSTRACT

Disclosed herein, among other things, is a method for fitting a hearing assistance device for a user using a genetic algorithm. Stimulus pairs are presented to the user using a computer, the stimulus pairs adapted to provide contrasting options for selection from a set of stimuli stored in the computer. Inputs are received from the user entered into the computer, including preference judgments of the user. A score is calculated for each stimulus of the pair using the computer to execute a rank agreement function to maximize agreement between scores and the preference judgments. A set of genes is selected based on the scores, where the set of genes correspond to hearing assistance device parameters. The set of genes is operated on with a genetic algorithm using the assigned scores to obtain a child set of genes. The child set is used to provide parameter values during fitting.

28 Claims, 6 Drawing Sheets

U.S. PATENT DOCUMENTS

| | | | |
|---|---|---|---|
| 5,581,747 | A | 12/1996 | Anderson |
| 5,659,621 | A | 8/1997 | Newton |
| 5,706,352 | A | 1/1998 | Engebretson et al. |
| 5,724,433 | A | 3/1998 | Engebretson et al. |
| 5,757,933 | A | 5/1998 | Preves et al. |
| 5,793,644 | A | 8/1998 | Koford et al. |
| 5,822,442 | A | 10/1998 | Agnew et al. |
| 5,825,631 | A | 10/1998 | Prchal |
| 5,835,611 | A | 11/1998 | Kaiser et al. |
| 5,852,668 | A | 12/1998 | Ishige et al. |
| 5,862,238 | A | 1/1999 | Agnew et al. |
| 5,946,673 | A | 8/1999 | Francone et al. |
| 6,035,050 | A | 3/2000 | Weinfurtner et al. |
| 6,041,129 | A | 3/2000 | Adelman |
| 6,148,274 | A | 11/2000 | Watanabe et al. |
| 6,236,731 | B1 | 5/2001 | Brennan et al. |
| 6,240,192 | B1 | 5/2001 | Brennan et al. |
| 6,347,148 | B1 | 2/2002 | Brennan et al. |
| 6,366,863 | B1 | 4/2002 | Bye et al. |
| 6,389,142 | B1 | 5/2002 | Hagen et al. |
| 6,449,662 | B1 | 9/2002 | Armitage |
| 6,718,301 | B1 | 4/2004 | Woods |
| 6,879,860 | B2 | 4/2005 | Wakefield et al. |
| 6,885,752 | B1 | 4/2005 | Chabries et al. |
| 6,888,948 | B2 | 5/2005 | Hagen et al. |
| 6,925,555 | B2 | 8/2005 | Chang et al. |
| 7,006,646 | B1 | 2/2006 | Baechler |
| 7,078,899 | B2 | 7/2006 | Dale et al. |
| 7,149,320 | B2 | 12/2006 | Haykin et al. |
| 7,242,777 | B2 | 7/2007 | Leenen et al. |
| 7,283,638 | B2 | 10/2007 | Troelsen et al. |
| 7,283,842 | B2 | 10/2007 | Berg |
| 7,343,021 | B2 | 3/2008 | Takagi et al. |
| 7,395,235 | B2 | 7/2008 | Dhurandhar et al. |
| 7,650,004 | B2 | 1/2010 | Durant |
| 7,711,662 | B2 | 5/2010 | Buscema |
| 2001/0005420 | A1 | 6/2001 | Takagi et al. |
| 2001/0007050 | A1 | 7/2001 | Adelman |
| 2001/0033664 | A1 | 10/2001 | Poux et al. |
| 2001/0055404 | A1 | 12/2001 | Bisgaard |
| 2002/0076073 | A1 | 6/2002 | Taenzer et al. |
| 2003/0007647 | A1 | 1/2003 | Nielsen et al. |
| 2003/0133578 | A1 | 7/2003 | Durant |
| 2004/0030414 | A1 | 2/2004 | Koza et al. |
| 2004/0066944 | A1 | 4/2004 | Leenen et al. |
| 2004/0102863 | A1 | 5/2004 | Yoshida et al. |
| 2004/0181266 | A1 | 9/2004 | Wakefield et al. |
| 2004/0190739 | A1 | 9/2004 | Bachler et al. |
| 2004/0202340 | A1 | 10/2004 | Armstrong et al. |
| 2005/0107845 | A1 | 5/2005 | Wakefield et al. |
| 2005/0111683 | A1 | 5/2005 | Chabries et al. |
| 2005/0119837 | A1 | 6/2005 | Prakash et al. |
| 2005/0129262 | A1 | 6/2005 | Dillon et al. |
| 2005/0283263 | A1 | 12/2005 | Eaton et al. |
| 2006/0161391 | A1 | 7/2006 | Inaba et al. |
| 2006/0178711 | A1 | 8/2006 | Patrick et al. |
| 2006/0195204 | A1 | 8/2006 | Bonabeau et al. |
| 2006/0222194 | A1 | 10/2006 | Bramslow et al. |
| 2006/0227987 | A1 | 10/2006 | Hasler |
| 2006/0271441 | A1 | 11/2006 | Mueller et al. |
| 2007/0009123 | A1 | 1/2007 | Aschoff et al. |
| 2007/0019817 | A1 | 1/2007 | Siltmann |
| 2007/0020299 | A1 | 1/2007 | Pipkin et al. |
| 2007/0076909 | A1 | 4/2007 | Roeck et al. |
| 2007/0135862 | A1 | 6/2007 | Nicolai et al. |
| 2007/0217620 | A1 | 9/2007 | Zhang et al. |
| 2007/0217629 | A1 | 9/2007 | Zhang et al. |
| 2007/0219784 | A1 | 9/2007 | Zhang et al. |
| 2007/0237346 | A1 | 10/2007 | Fichtl et al. |
| 2007/0276285 | A1 | 11/2007 | Burrows et al. |
| 2009/0048991 | A1 | 2/2009 | Kobayashi |
| 2009/0154741 | A1 | 6/2009 | Woods et al. |
| 2009/0279726 | A1 | 11/2009 | Baskent |
| 2010/0172524 | A1 | 7/2010 | Durant |
| 2011/0016065 | A1* | 1/2011 | Chapelle et al. ............ 706/12 |
| 2011/0046794 | A1 | 2/2011 | Duke et al. |

FOREIGN PATENT DOCUMENTS

| | | |
|---|---|---|
| DE | 10062649 | 6/2001 |
| EP | 0396831 A2 | 11/1990 |
| EP | 0537026 A2 | 4/1993 |
| EP | 1256258 B1 | 3/2005 |
| JP | 2001-175637 | 6/2001 |
| WO | WO-9802825 A2 | 1/1998 |
| WO | WO-0021332 A2 | 4/2000 |
| WO | WO-03045108 A2 | 5/2003 |
| WO | WO-03045108 A3 | 5/2003 |
| WO | WO-2005002433 A1 | 1/2005 |
| WO | WO-2005018275 A2 | 2/2005 |
| WO | WO-2007045276 A1 | 4/2007 |
| WO | WO-2007112737 A1 | 10/2007 |

OTHER PUBLICATIONS

Furnkranz, Johannes et al.; "Pairwise Preference Learning and Ranking"; 2003; Springer-Verlag; ECML 2003, LNAI 2827; pp. 145-156.*

Durant, Eric A. et al.; "Efficient Perceptual Tuning of Hearing Aids With Genetic Algorithms"; 2004; IEEE Transactions on Speech and Audio Processing, vol. 12, No. 2; pp. 144-155.*

Hullermeier, Eyke et al.; "Comparison of Ranking Procedures in Pairwise Preference Learning"; 2004; Proceedigs of the 10th International Conference on Information Processing and Management of Uncertainty in Knowledge-Based Systems; 8 pages.*

Baskent, D. et al.; "The Genetic Algorithms: A New Fitting Tool for Optimizing Hearing Aids' Advanced Features"; Cited at http://www.starkeyresearch.com/our-research/publications.jsp; 2007; 1 page.*

Eiler, Cheryl et al.; "Genetic Algorithms: Are they the future of hearing aid fittings?"; 2008; The Hearing Journal, 61(12); pp. 16-19.*

"U.S. Appl. No. 10/051,757, Final Office Action mailed Jun. 11, 2009", 24 pgs.

"U.S. Appl. No. 10/051,757, Final Office Action mailed Aug. 24, 2006", 5 pgs.

"U.S. Appl. No. 10/051,757, Non-Final Office Action mailed Jan. 13, 2006", 5 pgs.

"U.S. Appl. No. 10/051,757, Non-Final Office Action mailed Apr. 21, 2008", 19 pgs.

"U.S. Appl. No. 10/051,757, Non-Final Office Action mailed Sep. 21, 2007", 7 pgs.

"U.S. Appl. No. 10/051,757, Non-Final Office Action mailed on Nov. 14, 2008", 30 pgs.

"U.S. Appl. No. 10/051,757, Notice of Allowance mailed Mar. 16, 2007", 4 pgs.

"U.S. Appl. No. 10/051,757, Notice of Allowance mailed Oct. 5, 2009", 13 pgs.

"U.S. Appl. No. 10/051,757, Preliminary Amendment filed Mar. 22, 2002", 2 pgs.

"U.S. Appl. No. 10/051,757, Response filed Jan. 24, 2007 to Final Office Action mailed Aug. 24, 2006", 11 pgs.

"U.S. Appl. No. 10/051,757, Response filed Feb. 17, 2009 to Non-Final Office Action mailed Nov. 14, 2008", 16 pgs.

"U.S. Appl. No. 10/051,757, Response filed Jun. 9, 2006 to Non-Final Office Action mailed Jan. 13, 2006", 13 pgs.

"U.S. Appl. No. 10/051,757, Response filed Jul. 21, 2008 to Non-Final Office Action mailed Apr. 21, 2008", 14 pgs.

"U.S. Appl. No. 10/051,757, Response filed Sep. 11, 2009 to Final Office Action mailed Jun. 11, 2009", 10 pgs.

"U.S. Appl. No. 10/051,757, Response filed Oct. 27, 2005 to Restriction Requirement filed Sep. 30, 2005", 11 pgs.

"U.S. Appl. No. 10/051,757, Restriction Requirement filed Sep. 30, 2005", 4 pgs.

"U.S. Appl. No. 10/051,757, Response filed Jan. 22, 2008 to Non-Final Office Action mailed Sep. 21, 2007", 15 pgs.

"U.S. Appl. No. 11/276,795, Non Final Office Action mailed May 7, 2009", 13 pgs.

"European Application Serial No. 02803615.0, Office Action mailed Apr. 5, 2007".

"European Application Serial No. 08253924.8, Search Report mailed on Jul. 1, 2009", 8 pgs.

"European Search Report for corresponding EP Application No. EP 07250920", (May 3, 2007), 6 pgs.

Baskent, Deniz, "Simulating listener errors in using genetic algorithms for perceptual optimization", *J. Acoust. Soc. Am 121* (6), (Jun. 2007), 6 pgs.

Baskent, Deniz, et al., "Using Genetic Algorithms with Subjective Input from Human Subjects: Implications for Fitting Hearing Aids and Cochlear Implants", *Ear & Hearing 28* (3),Starkey Earing Research Center, Berkeley, California, (2007), 370-380.

Byrne, D, "Paired Comparison Procedures in Hearing Aid Evaluations", *Ear & Hearing*,(1994), pp. 476-479.

Durant, E A., et al., "Hearing Aid Fitting with Genetic Algorithms", *Dissertation Presented at the International Hearing Aid Research Conference (IHCON)*, (2002), 1 pg.

Griffing, Terry S, et al., "Acoustical Efficiency of Canal ITE Aids", *Audecibel*, (Spring 1983), 30-31.

Griffing, Terry S, et al., "Custom canal and mini in-the-ear hearing aids", *Hearinq Instruments*, vol. 34, No. 2, (Feb. 1983), 31-32.

Griffing, Terry S, et al., "How to evaluate, sell, fit and modify canal aids", *Hearing Instruments*, vol. 35, No. 2, (Feb. 1984), 3.

Mahon, William J, "Hearing Aids Get a Presidential Endorsement", *The Hearing Journal*, (Oct. 1983), 7-8.

Mueller, Gustav H, "Data logging: Its popular, but how can this feature be used to help patients?", *The Hearing Journal* vol. 60, No. 10 XP002528491, (Oct. 2007), 6 pgs.

Oshaki, M, et al., "Improvement of Presenting Interface by Predicting the Evaluation Order to Reduce the Burden of Human Interactive EC Operators", *SMC Conference Proceedings. IEEE International Conference on Systems, Man, and Cybernetics*, (1998), pp. 1284-1289.

Preves, David A., "Field Trial Evaluations of a Switched Directional/Omnidirectional In-the-Ear Hearing Instrument", *Journal of the American Academy of Audiology*, 10(5), (May 1999), 273-283.

Sullivan, Roy F, "Custom canal and concha hearing instruments: A real ear comparison Part I", *Hearing Instruments*, 40(4), (Jul. 1989), 5.

Sullivan, Roy F, "Custom canal and concha hearing instruments: A real ear comparison Part II", *Hearing Instruments*, vol. 40, No. 7, (Jul. 1989), 6.

Takagi, H, et al., "Discrete Fitness Values for Improving the Human Interface in an Interactive GA", *Proceedings of the IEEE International Conference on Evolutionary Computation*, (1996), pp. 109-112.

Takagi, H, et al., "IEC-based Hearing Aid Fitting", *IEEE International Conference on Systems, Man, and Cybernetics*,(1999), pp. 657-662.

Takagi, H, "System Optimization Without Numerical Target", *Biennial Conference of the North American Fuzzy Information Processing Society (NAFIPS)*, (1996), pp. 351-354.

Watanabe, T, et al., "Recovering System of the Distorted Speech using Interactive Genetic Algorithms", *IEEE International Conference on Systems, Man, and Cybernetics. Intelligent Systems for the 21st Century*, (1995), pp. 684-689.

"U.S. Appl. No. 12/436,337, Non Final Office Action mailed Sep. 21, 2011", 11 pgs.

"U.S. Appl. No. 12/651,154, Preliminary Amendment mailed Dec. 31, 2009", 3 pgs.

"U.S. Appl. No. 12/651,154, Supplemental Preliminary Amendment filed Jul.1, 2010", 5 pgs.

"Canadian Application Serial No. 2,467,352, Office Action mailed Jul. 31, 2007", 3 pgs.

"European Application Serial No. 02803615.0, European Search Report mailed Aug. 17, 2007", 4 pgs.

"European Application Serial No. 02803615.0, Office Action mailed Aug. 9, 2010", 5 Pgs.

"European Application Serial No. 02803615.0, Office Action mailed Aug. 22, 2007", 3 pgs.

"European Application Serial No. 02803615.0, Response filed Mar. 3, 2008 to Office Action mailed Aug. 22, 2007", 14 pgs.

"European Application Serial No. 02803615.0, Response filed Dec. 17, 2010 to Office Action mailed Aug. 9, 2010", 12 pgs.

Nomura, Tatsuya, "An Analysis on Linear Crossover for Real number Chromosomes in an Infinite Population Size", IEEE, (1997), 1-4.

\* cited by examiner

GENETIC ALGORITHMS WITH ROBUST RANK ESTIMATION FOR HEARING ASSISTANCE DEVICES

CROSS REFERENCE TO RELATED APPLICATIONS

This application is related to U.S. application Ser. No. 12/436,337, filed on May 6, 2009, which claims the benefit of U.S. Provisional Application No. 61/050,884, filed on May 6, 2008, under 35 U.S.C. §119(e), which are hereby incorporated by reference in their entirety.

TECHNICAL FIELD

This application relates generally to hearing assistance devices, and more particularly to methods and apparatus for using genetic algorithms to efficaciously fit hearing assistance devices.

BACKGROUND

Many fields encounter problems associated with perceptually tuning a system. For example, in perceptually tuning or "fitting" a hearing assistance device, such as a hearing aid, antiquated methods subjected a single hearing impaired user to many and various audio-related settings of their hearing aid and, often via technical support from an audiologist, individually determined the preferred settings for that single user. This approach, however, has proven itself lacking in universal applicability.

Thus, prescriptive fitting formulas have evolved whereby large numbers of users can become satisfactorily fit by adjusting the same hearing assistance device. With the advent of programmable hearing aids, this approach has become especially more viable. This approach is, however, still too general because individual preferences are often ignored. In one particular hearing assistance device fitting selection strategy, paired comparisons were used. In this strategy, users were presented with a choice between two actual hearing aids from a large set of hearing aids and asked to compare them in an iterative round robin, double elimination tournament or modified simplex procedure until one hearing aid "winner" having optimum frequency-gain characteristics was converged upon. These uses of paired comparisons, however, are extremely impractical in time and financial resources. Moreover, such strategy cannot easily find implementation in an unsupervised home setting by an actual hearing aid user.

In a more recent and very limited selection strategy, genetic algorithms were blended with user input to achieve a hearing assistance device fitting. As is known, and as its name implies, genetic algorithms are a class of algorithms modeled upon living organisms' ability to ensure their evolutionary success via natural selection. In natural selection, the fittest organisms survive while the weakest are killed off. The next generation of organisms (children) are, thus, offspring of the fittest organisms from the previous generation (parents). Genetic algorithm programs for perceptual optimization include a number of possible solutions (or hearing assistance device settings) that comprise a population of genes, and the best potential solutions are passed on to the next generation while the poor solutions died off. In the context of perceptual optimization, the best and worst genes are determined by a user's (human listener's) preferences. Genetic algorithms can use subjective input from a user based on preference levels using paired comparisons.

Previous methods of estimating rank order from paired comparisons depend on the consistency of user judgments. If even one user judgment is incorrect, rank order produced by these previous methods would be severely compromised.

What is needed in the art is a more robust ranking strategy for fitting or tuning hearing assistance devices to individual users' preferred settings. The art needs better genetic algorithm operations for perceptually tuning a system using subjective user judgments.

SUMMARY

The present subject matter provides apparatus and methods for fitting a hearing assistance device using a genetic algorithm. The present subject matter robustly estimates the perceptual rank order of a set of alternatives (e.g., stimuli, hearing aid programs) taking as its only user input a series of paired comparison judgments. In some embodiments, strength of preference information is used. The present subject matter is also robust to occasional errors in user input, in either judgment direction or strength of judgment. The order of stimulus pairs to present to the user is also determined, in various embodiments.

This summary is an overview of some of the teachings of the present application and is not intended to be an exclusive or exhaustive treatment of the present subject matter. Further details about the present subject matter are found in the detailed description. The scope of the present invention is defined by the appended claims and their equivalents.

DETAILED DESCRIPTION

Figure 1A:
FIG. 1A illustrates a perceptual tuning system showing a hearing assistance device user and apparatus useful in an audio fitting thereof, according to one embodiment of the present subject matter.

The following detailed description refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

The present subject matter pertains to methods and apparatus for fitting a hearing assistance device for a user using a genetic algorithm. A number of stimulus pairs to present to the user is determined based on the total number of stimuli in a set. The order to present stimulus pairs to the user is determined by minimizing degrees of distance between elements of various possible stimulus pairs. The stimulus pairs are presented to the user in the order determined and the user is allowed to provide preference judgments. According to various embodiments, the preference judgments are selected by the user from list of strength of preference judgments, the list including multiple options to provide feedback on which stimulus is preferred and the strength of preference. The preference judgments are received from the user and a score is assigned to each stimulus using a rank agreement function to maximize agreement between scores and preference judgments, according to various embodiments.

Many modern hearing assistance devices, such as hearing aids and cochlear implants for example, offer numerous features that have to be optimized for an individual user. Finding the optimal settings can be difficult, as individuals might have different pathologies in the auditory system and might also have different listening preferences. Moreover, some of the features might interact with each other, further complicating the fitting process. Theoretically, the best settings can be determined by a functional measurement that can be made for each patient and for all device features individually or in combinations. However, this would not be realistic as such a fitting would require more time and expense than most clinics or patients could afford. To simplify the fitting process for clinicians, manufacturers provide default parameter settings based on clinical and electroacoustic data, and the best parameter values for each listener are usually found by trial-and-error. This limited set of parameters might not be sufficient to provide a satisfactory fitting to all patients with varying pathologies and preferences. Furthermore, with the advances in digital signal processing and features that are becoming more sophisticated, manufacturers themselves might not be fully aware of the best default settings for new algorithms.

Optimization algorithms have been proposed for a fast, systematic, and flexible fitting of device parameters. One example of an optimization algorithm is a genetic algorithm (GA). These algorithms produce candidate parameter settings that are evaluated by a listener who listens to speech stimuli with the device under each setting. A set of device parameters is modified according to the rules of the optimization algorithm using the subjective input of the listener or patient. These steps of evaluation and modification continue in iterations until parameter settings that are satisfactory to the patient are found. Optimization algorithms are generally fast because the final solution is usually reached by evaluation of only a small fraction of all possible solutions. Flexibility is another advantage, as any device feature can be fitted with a GA. However, difficulties exist with applications involving input from human subjects. When optimization algorithms are used for fitting settings to a human listener's preferences, the main evaluation tool is the subjective response of the listener. Factors such as varying linguistic skills and speech recognition can cause difficulty of optimization. Under these conditions, there is no metric available to quantitatively measure the suitability of the final solution. The present subject matter provides for analysis of feasibility of GAs in optimizing auditory settings using the subjective input from listeners. In addition, the present subject matter provides improved methods for optimizing auditory settings of hearing assistance devices.

System for Fitting a Hearing Assistance Device

Figure 1B:
FIG. 1B illustrates a wireless perceptual tuning system showing a hearing assistance device user and apparatus useful in an audio fitting thereof, according to one embodiment of the present subject matter.

With reference to FIG. 1A, a perceptual tuning system of the present subject matter is shown generally as 10. The system, as presented in this figure and the remaining description, is in the context of fitting a hearing assistance device for a sensorineurally impaired user. It will be appreciated, however, that the system may and should be extended to various other environments, such as tuning a radio, a personal data assistant or any of a number of devices requiring such tuning. Thus, the present subject matter is not expressly limited to a hearing assistance device fitting unless so defined in the claims. As illustrated, the system 10 has a user 12 outfitted with a hearing assistance device 14, an apparatus 16 in a hand held configuration for audio fitting the hearing assistance device via user selection of paired comparisons stored in and derivable therefrom and a communications link 18 in between. In one embodiment, as depicted by FIG. 1B, the communications link 18 is a wireless link and the necessary communications hardware are found in apparatus 16 and hearing assistance device 14 to support the wireless link. Apparatus 16 is a self-contained device ready for field use (e.g., home use) in an unsupervised setting. Apparatus 16 includes a personal computer, such as a desktop or laptop, in an embodiment.

It will be further appreciated that the system of FIG. 1A (or FIG. 1B) is shown as a left hearing aid configuration and one skilled in the art will be readily able to adapt the teachings herein and apply them without undue experimentation to right hearing aid embodiments and to systems having both left and right hearing aid embodiments. It will be even further appreciated that hearing assistance devices, although always having analog components, such as microphones and receivers, are generally referred to according to their primary mode of signal processing (analog processing or digital signal processing (DSP)) and can be of any type as described herein. The claims, therefore, are not to be construed as requiring a specific type of hearing assistance device. Still further, although not shown, the present subject matter may find applicability in contexts in which an audiologist uses apparatus 16 to assist user 12 in fitting hearing assistance device 14.

Figure 2:
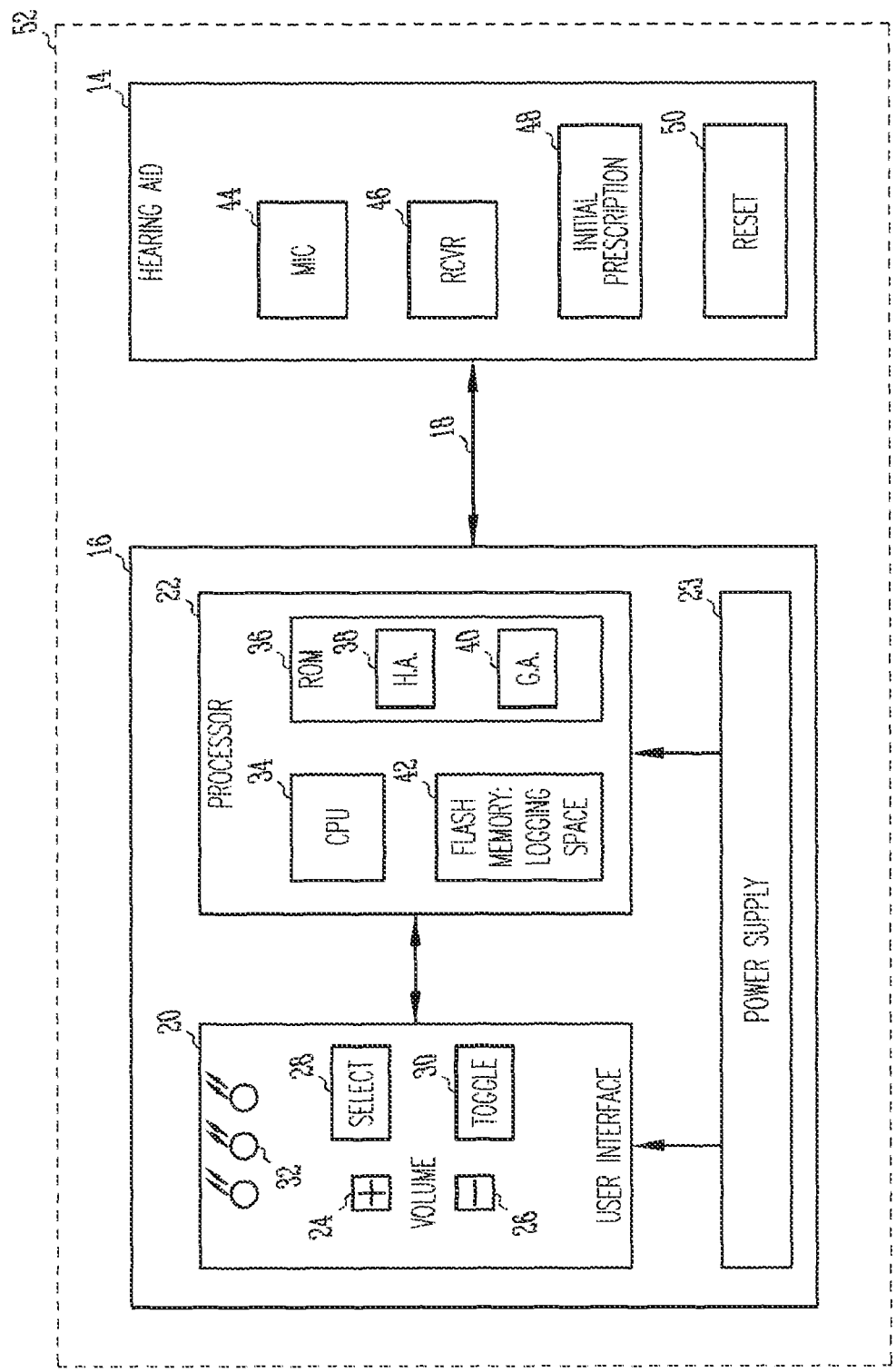
FIG. 2 illustrates a block diagram in accordance with the teachings of the present subject matter for the system of FIG. 1A or FIG. 1B, according to various embodiments of the present subject matter.

With reference to FIG. 2, the apparatus 16 and hearing assistance device 14 (shown as a hearing aid in this embodiment) of system 10 are representatively shown in block diagram format and will be described first in terms of their electro-mechanical interconnections. Thereafter, and with simultaneous reference to other figures, the apparatus and hearing aid of system 10 will be described in functional detail.

In the embodiment shown, apparatus 16 includes fully integrated user interface 20, processor 22 and power supply 23 for providing necessary voltage and currents to the user interface and processor. In an alternative embodiment, the apparatus 16 is separated into discrete components and/or discrete/integrated hybrids connected by appropriate communications links between the functional blocks with common or discrete internal or external power supplies. User interface 20 may include volume switches 24, 26, respectively, for increasing (+) or decreasing (−) a volume of the apparatus 16 as appropriate. Select indicator 28 is used to indicate user preference between paired comparisons. Toggle device 30 allows the user to toggle back and forth between paired comparisons as often times as necessary before indicating their preference. Other types of buttons, knobs, levers, keyboard, mouse, etc. can be used by a listener to indicate their preference, without departing from the scope of this disclosure. In an embodiment described below, a user is presented with a list of strength of preference judgments to select from to indicate not only which is preferred, but to what degree. The volume switches 24, 26, the select indicator 28 and toggle device 30 may be any of a variety of well known integrated or discrete switches, slides, buttons, or a graphic depiction of such on a computer display, etc. They can include electro-mechanical switches that send electrical signals in response to a mechanical manipulation thereof. They can have appropriate size and shape to enable users to comfortably and intuitively manipulate them with very little manual dexterity. In another embodiment, the toggle device 30 is not a mechanical device to be manipulated by a user but a software algorithm stored in processor memory that automatically toggles between paired comparisons according to a preferred timing schedule. Visual indicators 32 of varying number, color and pattern are also preferably provided in the form of lights, such as light-emitting diodes (LED) to provide immediate visual feedback to the user upon manipulation of one of the user inputs. Connected to the user interface 20 is processor 22 having a central processing unit 34, preferably a DSP with internal on-chip memory, read-only memory (ROM) 36 and flash memory 42 for use as a logging space of the user inputs from user interface 20. ROM 36 preferably includes at least two algorithms, hearing aid algorithms 38 and genetic algorithms 40. In a fashion similar to that of the apparatus itself, it should be appreciated that processor 22 may be a fully integrated device or comprised of discrete components or a discrete/integrated hybrid and that all such embodiments are embraced herein. The foregoing apparatus 16 is connected at one end of the communications link 18. At the other end is the hearing aid 14. In one embodiment, the communications link 18 is a set of wire(s). In an alternate embodiment, the link 18 is wireless. The link 18 in such embodiments includes, but is not limited to, any well known or hereinafter developed communications scheme, modulated or un-modulated technologies, including, but not limited to, wireless radio frequencies, infrared transmitter/receiver pairs, Bluetooth technologies, etc. In such embodiments, suitable hardware/software processing devices would be contained in the apparatus 16 and the hearing aid 14.

As shown, the hearing assistance device (such as hearing aid 14) contains an initial prescription setting 48, a microphone 44, a receiver 46 and a reset mechanism 50. It will be appreciated the hearing assistance device also contains other mechanisms that are not shown but are well known to those skilled in the art, such as a power supply and a signal processor. In one embodiment the apparatus 16 and hearing aid 14 are discrete components. In another embodiment, the entire contents of apparatus 16 and hearing aid 14 are fully integrated into one single hearing aid package 52.

Before describing the functional operation of the apparatus 16 together with hearing aid 14, or, alternatively, completely integrated hearing aid package 52, some words and nomenclature as used throughout this specification are presented. A "parameter" as used herein relates to a characteristic element of the system 10 that can take on a discrete value. In some embodiments, the discrete value is selected from one of a range of values. In one embodiment, for example, a parameter of Filter Length, L, (in # of filter taps) the discrete parametric value is 9. It is understood that the parameter L is not limited to a particular value of 9 and can be another number. The parameter L is capable of being any of the discrete values, including, but not limited to, 1, 2, 3, 4, 5, 6, 7, 8, 9, 10, 13, 16, 20, 25, 32, 40, etc. In one embodiment, the filter length L may be as short as 1 (mere scaling of the input) and as long 256. The parameter L may be a discrete value taken from a range of countable numbers, for example, $\{3, 4, 5, 6, \ldots, N \text{ or Infinity}\}$. The parameter L may also be a discrete value taken from an irregular set, such as $\{8, 10, 13, \ldots, 32, 40\}$, for example. Other range types and ranges are possible, and the examples given here are not intended in a limited or exclusive sense. Typically what constrains the upper limit is the size of available memory, processing speed and the ability of a user to discern differences in that many filter taps. Some particular examples of parameters for perceptually tuning a hearing assistance device may be, but are not limited to, any of the following terms well known to research audiologists and audio processing engineers skilled in the art: gain, compression ratio, expansion ratio, frequency values, such as sampling and crossover frequencies, time constant, filter length, compression threshold, noise reduction, feedback cancellation, output limiting threshold, compression channel crossover frequencies, directional filter coefficients, constrained representations of large parameter groupings, and other known or hereinafter considered parameters. A "set" as used herein is one or more parameters. A "population" is a plurality of sets. Capital letters A, B, C, D, ... X, ... etc., having subscripts or superscripts or both therewith will either be a particular parameter, such as $A_1$ or $A=_1$, or a particular set, such as set A, set A=, set B, set C, ... set X, ... etc. and will be understood from the context in which they are used. Numerous sets and sets of sets will be hereinafter presented.

Robust Rank Estimation

The present subject matter robustly estimates the perceptual rank order of a set of alternatives (e.g., stimuli, hearing aid programs) taking as its only user input a series of paired comparison judgments. In some embodiments, strength of preference information is used. The present subject matter is also robust to occasional errors in user input (in either judgment direction or strength of judgment). The order of stimulus pairs to present to the user is also determined, in various embodiments.

The present subject matter is useful in any application that requires a rank order ($1^{st}$ place, $2^{nd}$ place, etc.) of a set of alternatives that are to be judged by a user. A key advantage is that rank order can be estimated from repetitions of a very simple user task: comparing two alternatives; the user is never required to directly organize three or more items.

A particular application of the present subject matter is in a genetic algorithm for fitting hearing assistance devices. Prior solutions to the current problem of estimating rank order from paired comparisons lack the robustness of the current subject matter, however, and are likely to generate a very poor estimate of rank order if even one user judgment is incorrect.

An embodiment of the described method has two major portions. The first portion decides in which order to present various stimulus pairs from a set of stimuli to the user for paired preference judgments. The second portion makes a robust estimate of the perceptual rank order of the entire set of stimuli based on the set of preference judgments. According to various embodiments, the following formula is used to determine how many stimulus pairs to present to the user:

$$C = \left\lfloor \frac{N \log_2 N}{A} + 0.5 \right\rfloor$$

where N is the number of items being compared/ranked. The $N \log_2 N$ factor is based on the lower bound for comparisons in a sorting operation. The addition of 0.5 before rounding down accomplishes rounding to the nearest integer. According to one embodiment, the constant A is empirically chosen to be 1.5, yielding the following values:

| N | C |
|---|---|
| 2 | 1 |
| 3 | 3 |
| 4 | 5 |
| 5 | 8 |
| 6 | 10 |
| 7 | 13 |
| 8 | 16 |

Stimulus pairs are repeatedly selected to present to the user for comparison until C comparisons are made. The pairs are selected based on the degrees of distance between elements of the various possible stimulus pairs.

The following symmetric matrix represents the number of comparisons needed to move between any two of four total stimuli:

$$D = \begin{bmatrix} 0 & 1 & 2 & \infty \\ 1 & 0 & 1 & \infty \\ 2 & 1 & 0 & \infty \\ \infty & \infty & \infty & 0 \end{bmatrix}$$

In an embodiment, the four stimuli are, in order, W, X, Y, and Z. The 0s indicate that no comparisons are needed to evaluate the relation of a stimulus to itself; a stimulus is taken to be equivalent to itself. The 1 at location (1, 2) (equivalently at (2, 1)) indicates that the user has made a comparison of W with X; that is, that only one comparison is needed to relate W to X. The other 1 in the upper triangular portion indicates a comparison of X with Y has been made. The number of 1s in the upper triangular portion (two in this case) indicate how many direct comparisons have been made; the algorithm as stated does not deal with multiple evaluations of the same pair, but could be adapted to do so. The pair (W, Y) at (1, 3) and, equivalently, (3, 1) has a distance of 2 due to its elements' mutual connection to X. The pairs (W, Z), (X, Z), and (Y, Z) all have a distance of infinity because Z has not been compared to any other stimulus. If comparison data became available for (W, Y), its distance would be reduced to 1 and the other distances would remain unchanged.

The next pair is chosen to present in a way that attempts to minimize the connection distance between stimuli. The stimulus that has the weakest connection to the overall set of stimuli is chosen first, in various embodiments. This is defined as the stimulus that is an infinite distance away from the maximum number of other stimuli, with ties (which include no distances being infinite) broken according to the sum of the non-infinite distances between a stimulus and all other stimuli, with remaining ties broken randomly. In various embodiments, this is succinctly represented in a computer language by treating "infinity" as a carefully chosen large but finite value, specifically at least $=(N(N-1)/2)+1$ where N is the number of stimuli. Now that the first stimulus of the pair is found, its partner must be found. The partner is the stimulus that has the weakest connection to the first stimulus. This is defined as the stimulus that is the farthest connection distance away, with ties (multiple infinities, or multiple finite numbers with no infinities) broken randomly.

The rules for choosing the first and second element of each pair serve to initially reduce by one on each comparison the number of "islands of stimuli" that are not reachable from one another; an infinity in D indicates that two stimuli are on separate islands. Such islands are undesirable since it is not be possible to come up with reasonable relative ranks for elements on different islands. At a bare minimum, then, N–1 comparisons are needed to eliminate multiple islands when considering N stimuli. Note that the equation for C satisfies this for various values of A, including 1.5, in an embodiment.

According to various embodiments, user preferences given a pair are represented with numbers (typically constrained to be integers) ranging from –R (strongly prefer the first alternative) to +R (strongly prefer the second alternative) with 0 indicating no preference. Magnitudes between 0 and R represent increasingly strong preferences. If the strength of preference is not collected in a particular application, just 0 and ±1 would be used (i.e., R=1); when only one non-zero magnitude is used, its particular value does not affect the algorithm.

Once C judgments are collected, a robust estimate of the perceptual rank order of the entire set of stimuli is made based on the set of preference judgments. According to various embodiments, the rank order is found that is most consistent with the judgments and their corresponding strengths. To facilitate this, an intermediate step is taken in which each stimulus is assigned a score on a relative scale from 0 (least preferred element in the set) to some arbitrary maximum positive number (the most preferred element in the set). The element with the highest score is assigned rank 1, the element with the next highest score is assigned rank 2, and so on until the element with the lowest score (0) is assigned the worst and highest rank number.

Figure 3A:
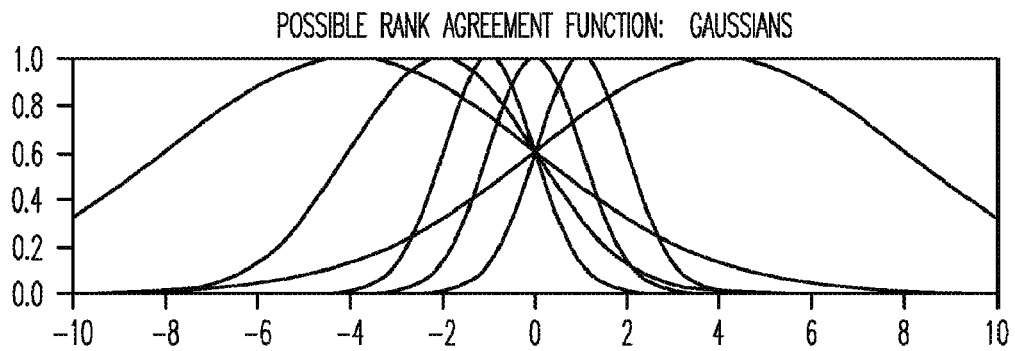
FIGS. 3A-3C illustrate graphical diagrams of rank agreement functions for fitting a hearing assistance device to a user, according to various embodiments of the present subject matter.
Figure 3B:
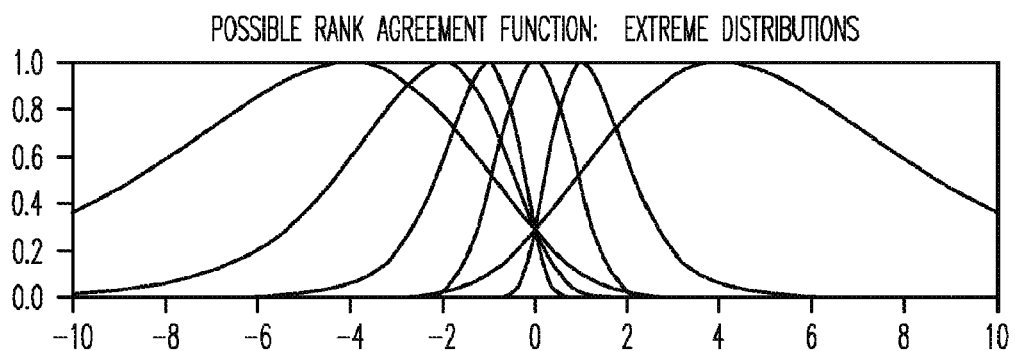
Figure 3C:
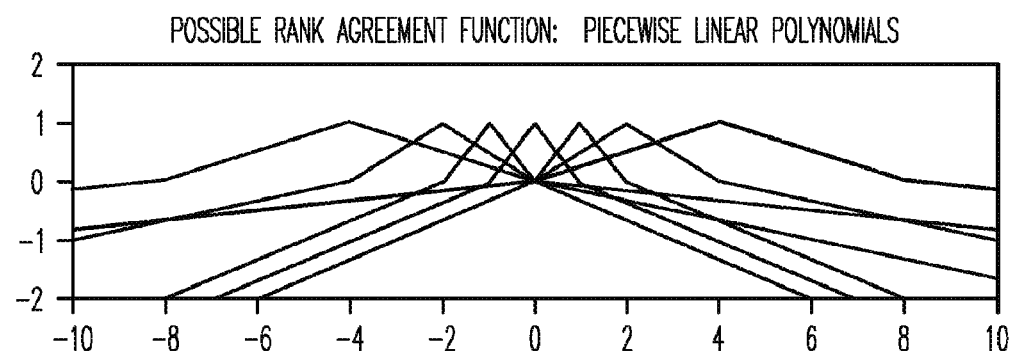

The assignment of scores is done in an attempt to maximize q, quality, which is a function of how well a set of scores matches a set of preference judgments. The quality is the sum of a set of "rank agreement" values, one for each preference judgment made. Rank agreement is a function of the difference in scores between the two elements being compared and the preference strength. The function reaches a maximum at some ideal score difference determined by the preference strength, and decreases as the actual score difference is farther from this ideal value. A sample set of functions used for a 7-point scale (R=3) is shown in FIGS. 3A-3C. There are seven rank agreement functions in each set, one each for the seven preference strengths with direction, from strongly preferring the first alternative (peak at –4) to strongly preferring the second alternative (peak at +4).

A set of scores can be evaluated for quality given a preference matrix and a set of 7 agreement functions, one for each item on the 7-point scale. Some properties of rank agreement functions have been chosen to gain the desired behavior. A rank agreement function must be unimodal with the peak at the desired score difference for a particular preference strength. In an embodiment, $A_i$ is a preference function, where i is one of the 7 preference scores from –3 to 3. In this case, $A_i(x)=A_{-i}(-x)$, because it is considered equivalent if both the presentation order and sense of preference are reversed. For example, if A is presented before B, a preference of +2 indicates a preference for B. But if B is presented before A, the same preference would be indicated as −2. This implies that $A_0$ is an even function. The maximum of each function is set to 1, representing the maximum possible contribution to quality of a set of scores of a particular judgment, thus $A_i(m_i) = 1$. There is no lower bound for an agreement function, although one may choose a set that has a lower bound, such as 0. In an embodiment, $m_i = −m_{−i}$ and $m_{i+1} > m_i$ in all 6 cases in which both terms are defined, and the values −4, −2, −1, 0, 1, 2, and 4 are used for the m values. Three sets of agreement functions are shown in FIGS. 3A-3C. FIG. 3A illustrates a Gaussian rank agreement function. However, these are less desirable due to their symmetry (preventing them giving good agreement to agreements in the wrong direction sacrificed many of their positive attributes). FIG. 3B illustrates an extreme distribution function, which solves the symmetry problem of Gaussians, but they asymptote to 0, not sufficiently penalizing distributions that are far off of the mark. FIG. 3C illustrates a piecewise linear polynomial function. This function exhibits gently sloping negative values that approach −∞ as the magnitude of the disagreement increases.

One approach for maximizing q is to start by considering one stimulus, then to add a second, third, and so on until all stimuli have been added to the set being scored. The first stimulus considered is the one with the greatest total preference weight across all items it was compared with. The preference weights range from 0 (no preference) to R (strongest preference) and are always positive numbers; the direction of the preference does not affect the preference weight. The second stimulus is the one that is the most connected to the first one; since all stimuli will have 0 or 1 connections to the first one, this means the second stimulus has 1 connection to the first one; if there is a tie, the first one found is chosen, but the tie could be broken randomly. The third stimulus is the one that is the most connected to the first two, with any tie again broken by choosing the first item found. The Nth stimulus is the one that is the most connected to the first N−1, with ties broken as before.

Once the order of consideration of the stimuli is determined, they are inserted into the set being scored. The first two stimuli are assigned arbitrary initial scores and a multidimensional unconstrained nonlinear optimization routine is run that works on samples (such as Powell's method or Nelder and Mead's simplex method) to adjust them to maximize the quality, q, as defined above. Since there is only one pair involved, the scores will separate exactly by the amount specified by the corresponding rank agreement function— there is only one constraint on the system and it can be satisfied perfectly. Next, the third stimulus is added to the set. The goal is to update the set of two scores found above to a set of three scores that maximizes quality for these three stimuli. According to various embodiments, the set of two scores is used as a starting point and three variations are tried: placing the score of the new item below all existing scores, placing it exactly in the middle of the two scores, or placing it above the two scores. The amount "below" or "above" is equivalent to the amount at which the rank agreement function for a slight (weakest) preference peaks. For each variation, the nonlinear optimizer is run in various embodiments. From the three resulting sets of three scores, the one that has the highest q value is selected. Each subsequent stimulus is added to the set in a similar manner. In general, when it is time to add the Nth stimulus to the set, the goal is to update the set of N−1 scores to a set of N scores that maximizes quality for these N stimuli. The set of N−1 scores is used as a starting point and N variations are tried, placing the score of the new item below all existing scores, placing it exactly between all adjacent pairs of scores, and placing it above all of the scores. For each variation, the nonlinear optimizer is used. From the N resulting sets of N scores, we choose the one that has the highest q value. The final set of N scores is converted to a set of ranks as discussed above.

Thus, the present subject matter provides a robust and efficient method for estimating the perceptual rank order of a set of stimuli. It is robust in that it works well despite the occasional user misjudgment. The method makes inferences based on subject input, and is not a simple, brittle "decision tree" approach, but one that considers a continuum of alternatives (rank orders) and chooses the best one. It is efficient in that the number of comparisons required grows with N log N, a known efficient sorting bound, instead of $N^2$ as required when collecting all pairwise comparisons. Further, the constant multiplier for the number of comparisons required is chosen empirically and can be changed to tune the algorithm to consider less information (run faster) or more information (run slower with potentially increased accuracy).

Strength of Judgment

The present subject matter provides a strength of judgment (or strength of preference) rating for use in the paired AB comparisons, to determine the fitness value of the genes in the perceptual optimization applications of the genetic algorithms. These AB comparisons are specifically used to evaluate how strongly a gene in the population is preferred by the listener. The strength of judgment rating provides more detailed information about the preferences compared to the simple AB comparisons where the listener only specifies which option they prefer, regardless of the strength of this preference. The detailed information about the preference strength is advantageous over the traditional method. The search space in perceptual optimization consists of the subjective preference space of the listener and there is no explicit expression of this space. Therefore it is important that reliable data is collected from the user about his/her preferences. A strength of judgment rating helps collect such reliable data and more detailed information about the subjective search space.

Genetic algorithms (GAs) are optimization procedures, commonly used in engineering applications. In these traditional approaches there is usually a metric to measure how accurate the solution produced by the GA is. The GAs can also be used for finding optimal settings for a listening situation, such as fitting hearing aids or cochlear implants to individual users or finding the best device settings for different listening environments. In such applications the search space of the algorithm is the perceptual space of the listener and the only metric to the program is the subjective input from the listener.

The GA program for such perceptual optimization works as follows: A number of possible solutions/settings compromise the population of the genes where the best potential solutions are passed on to next generation while the poor solutions die off. In the context of perceptual optimization, the best and worst genes are determined by human listener's preferences. The evaluation of the solutions in such a population can be conducted in a number of ways. Paired comparisons have been used in GAs that optimize on perceptual search space to determine the fitness value for individual genes of the population by user preference. The perceptual search space is not well-defined and may be complex with multiple peaks. Therefore, it is important to have relatively accurate judgment from the listener on the evaluation of the fitness of the genes, and paired comparison method has been shown to be reliable in obtaining such subjective judgment.

According to various embodiments, first a pair of genes is selected from the gene population. The listener then is presented with a pair of sound stimuli that are processed with the settings specified by these two genes, and asked to make a preference judgment between these two options (option A and option B). In the simplest form the listener may report "A better than B" or "B better than A," and this has been the method that was used in previous GA applications. There may also be an option for "A and B equally preferred" or "A and B the same." The present subject matter describes using strength of judgment ratings in the paired comparisons. In various embodiments, gradients to the strength of the preference are provided. In one embodiment, a 7-point scale is used, and there would be 7 options similar to these:

A strongly better than B,
A moderately better than B,
A slightly better than B,
A and B the same,
B slightly better than A,
B moderately better than A, and
B strongly better than A.

Figure 4:
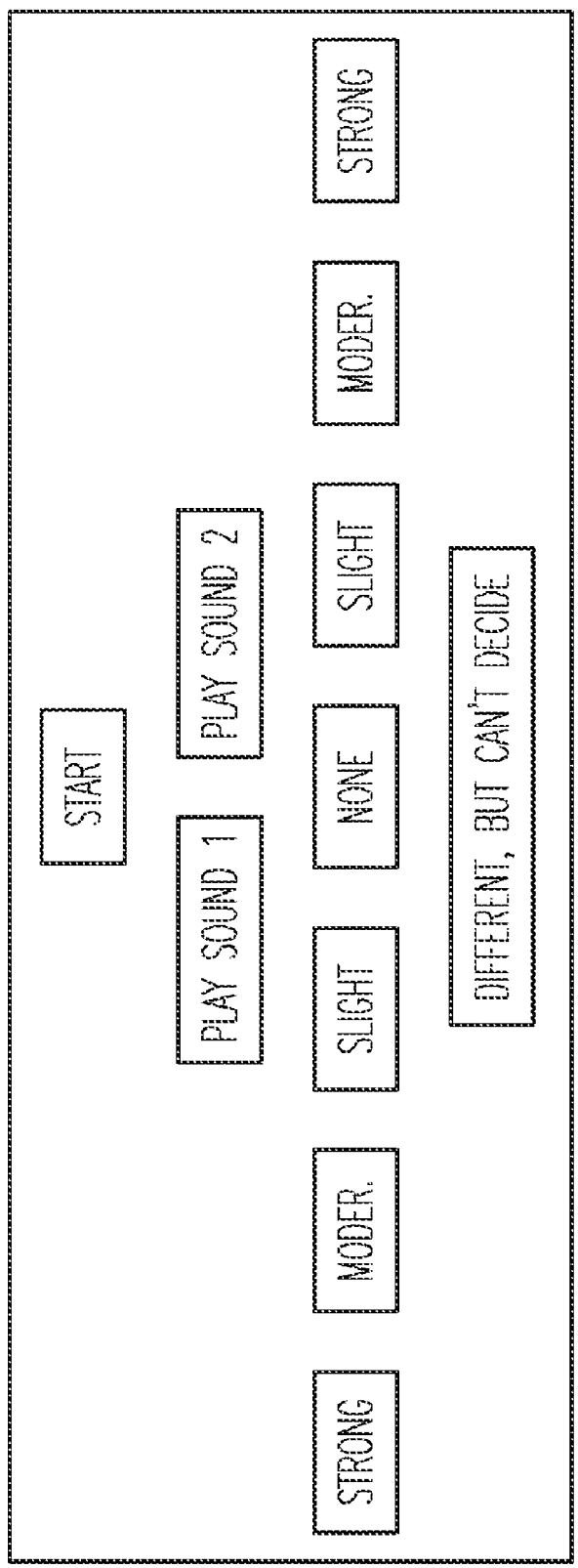
FIG. 4 illustrates a table showing an example of a user interface for a paired comparison using strength of preference judgments, according to one embodiment of the present subject matter.

FIG. 4 illustrates a table showing an example of a user interface for a paired comparison using strength of preference judgments, according to one embodiment of the present subject matter. A user interface for a 7-point AB comparison paradigm is depicted. In various embodiments, the pairs of genes are selected from the population until all combinations of two genes are completed. Once all paired comparisons are completed the genes can be ranked in multiple ways. In one implementation, the genes can be ranked by only counting the number of times they have won against other genes. In another implementation, the ranking can be done by using the preference strength that the listener entered in the paired comparisons. For example, for the 7-point scale rating method mentioned above, if A is strongly preferred against B, A can be assigned 3 points. If A is preferred moderately, it can be assigned 2 points. If it is slightly preferred, it could be assigned one point. At the end of all paired comparisons, these assigned points can be summed up to find the overall preference score for each gene. The gene with the highest preference score would be ranked as the best while the gene with the lowest preference score would be ranked as the worst.

Methods of Fitting a Hearing Assistance Device

Figure 5:
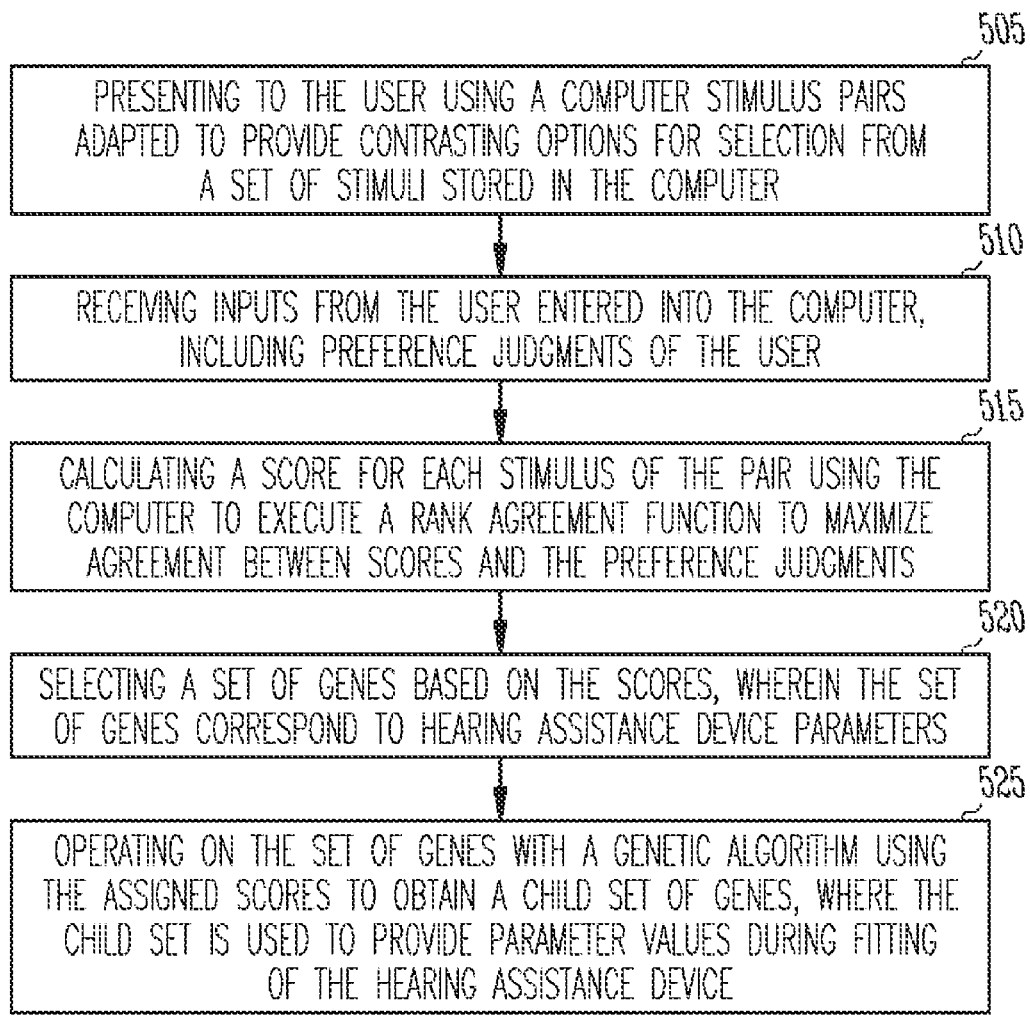
FIG. 5 illustrates a flow diagram of a method of fitting a hearing assistance device to a user, according to one embodiment of the present subject matter.

FIG. 5 illustrates a flow diagram of a method of fitting a hearing assistance device to a user, according to one embodiment of the present subject matter. Stimulus pairs are presented to the user using a computer, the stimulus pairs adapted to provide contrasting options for selection from a set of stimuli stored in the computer, at 505. At 510, inputs are received from the user entered into the computer, including preference judgments of the user. A score is calculated for each stimulus of the pair using the computer to execute a rank agreement function to maximize agreement between scores and the preference judgments, at 515. A set of genes is selected based on the scores, where the set of genes correspond to hearing assistance device parameters, at 520. At 525, the set of genes is operated on with a genetic algorithm using the assigned scores to obtain a child set of genes. The child set is used to provide parameter values during fitting of the hearing assistance device.

According to various embodiments, the method further includes determining a number of stimulus pairs to present to the user based on a total number of stimuli in the set. The method also includes determining in which order to present various stimulus pairs from the set of stimuli to the user for paired preference judgments, by minimizing degrees of distance between elements of various possible stimulus pairs, in various embodiments. This determination includes using a symmetric matrix representing a number of comparisons needed to move between stimuli, in an embodiment. Determining in which order to present various stimulus pairs includes choosing a next pair to present to the user in a way that attempts to minimize a connection distance between stimuli presented, in an embodiment. In one example, determining in which order to present various stimulus pairs includes choosing as a first pair to present to the user stimuli that have a weakest connection to the set of stimuli. In various embodiments, minimizing degrees of distance between elements of various possible stimulus pairs refers to separation distance. Distance refers to the number of comparisons needed to get from one element to another, also called degree of separation. Distance does not refer to the numerical difference between the parameters in a pair of genes.

One embodiment includes assigning scores to maximize a sum of a set of rank agreement values for each preference judgment made using a rank agreement function. In one embodiment, the score corresponds to a partial quality, and all the partial qualities are summed to produce a quality of a set of per-stimulus scores. The rank agreement function includes a function of difference in scores between stimuli being compared and preference strength. In various embodiments, the rank agreement function includes a multidimensional unconstrained nonlinear optimization function. Presenting stimulus pairs to the user includes presenting the user with a list of strength of preference judgments, the list including at least four options for the user to select from to provide feedback on which stimulus is preferred and the strength of preference, in an embodiment.

According to various embodiments, determining how many stimulus pairs to present includes using a logarithmic function. In one embodiment, the logarithmic function includes $C=[(N \log_2 N)/A+0.5]$, where C is the number of stimulus pairs, N is the total number of stimuli and A is an empirically chosen constant. The brackets in the equation indicate taking a floor function. In one equivalent embodiment of this equation, the factor of 0.5 can be dropped, and C can be defined as the integer nearest the given real quantity. The constant A is chosen to have a value of 1.5, in an embodiment.

Figure 6:
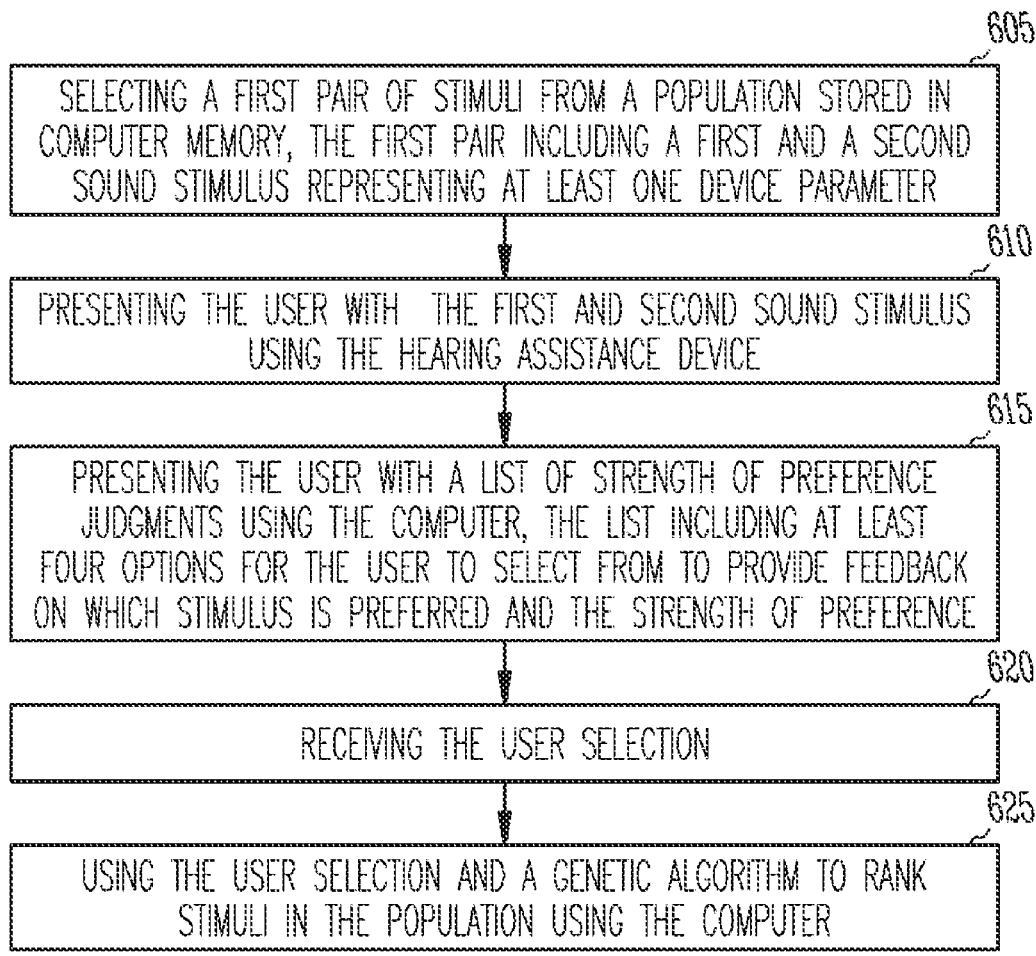
FIG. 6 illustrates a flow diagram of a method of fitting a hearing assistance device using strength of preference judgments, according to one embodiment of the present subject matter.

FIG. 6 illustrates a flow diagram of a method of fitting a hearing assistance device using strength of preference judgments, according to one embodiment of the present subject matter. The method uses a computer executed process, and includes selecting a first pair of stimuli from a population stored in computer memory, at 605. The first pair includes a first and second sound stimulus representing at least one device parameter. At 610, the user is presented with the first and second sound stimulus using the hearing assistance device, and with a list of strength of preference judgments using the computer, at 615. The list including at least four options for the user to select from to provide feedback on which stimulus is preferred and the strength of preference. In an embodiment, the four options include "prefer first stimulus", "prefer second stimulus", "different but cannot decide", and "no preference." At 620, the user selection is received, and used with a genetic algorithm to rank stimuli in the population using the computer, at 625.

According to various embodiments, the list of strength of preference judgments includes at least seven options. The list of strength of preference judgments includes that the user prefers one stimulus strongly better than an other stimulus, that the user prefers the one stimulus moderately better than the other stimulus, that the user prefers the one stimulus slightly better than the other stimulus, and/or that the user prefers the one stimulus the same as the other stimulus, in various embodiments. In an embodiment, the method further includes selecting a second pair of genes from a population representing at least one device parameter. The user is presented with a first and second sound stimulus with assistance of the hearing assistance device, and the user is presented with a list of strength of preference judgments for the second pair. The steps of selecting pairs of genes, presenting the user with sound stimuli, presenting the user with a list of judgments and receiving the user selection are repeated until all combinations of pairs of genes from the population are completed. Genes in the population are then ranked using a rating scale to assign points to the user selection based upon the strength of preference, and summing the points to provide an overall preference score for each gene, according to various embodiments.

It is understood that other combinations and configurations may be employed without departing from the scope of the present subject matter. This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. A method of fitting a hearing assistance device for a user, comprising:
   presenting to the user using a computer stimulus pairs adapted to provide contrasting options for selection from a set of stimuli stored in the computer;
   receiving inputs from the user entered into the computer, including preference judgments of the user;
   calculating a score for each stimulus of the pair using the computer to execute a rank agreement function to maximize agreement between scores and the preference judgments;
   selecting a set of genes based on the scores, wherein the set of genes correspond to hearing assistance device parameters;
   operating on the set of genes with a genetic algorithm using the assigned scores to obtain a child set of genes; and
   determining in which order to present various stimulus pairs from the set of stimuli to the user for paired preference judgments, by minimizing degrees of distance between elements of various possible stimulus pairs,
   wherein the child set is used to provide parameter values during fitting of the hearing assistance device.

2. The method of claim 1, further comprising:
   determining a number of stimulus pairs to present to the user based on a total number of stimuli in the set.

3. The method of claim 2, wherein determining a number of stimulus pairs to present includes using a logarithmic function.

4. The method of claim 1, wherein determining in which order to present various stimulus pairs includes using a symmetric matrix representing a number of comparisons needed to move between stimuli.

5. The method of claim 1, wherein determining in which order to present various stimulus pairs includes choosing a next pair to present to the user in a way that attempts to minimize a connection distance between stimuli presented.

6. The method of claim 1, wherein determining in which order to present various stimulus pairs includes choosing as a first pair to present to the user stimuli that have a weakest connection to the set of stimuli.

7. The method of claim 1, wherein calculating a score for each stimulus includes assigning scores to maximize a sum of a set of rank agreement values for each preference judgment made using a rank agreement function.

8. The method of claim 7, wherein the rank agreement function includes a function of difference in scores between stimuli being compared and preference strength.

9. The method of claim 1, wherein the rank agreement function includes a multidimensional unconstrained nonlinear optimization function.

10. The method of claim 1, wherein presenting stimulus pairs to the user includes presenting the user with a list of strength of preference judgments, the list including at least four options for the user to select from to provide feedback on which stimulus is preferred and the strength of preference.

11. A method for fitting a hearing assistance device for a user using a computer executed process, comprising:
   selecting a first pair of stimuli from a population stored in computer memory by minimizing degrees of distance between elements of various possible stimulus pairs, the first pair including a first and second sound stimulus representing at least one device parameter;
   presenting the user with the first and second sound stimulus using the hearing assistance device;
   presenting the user with a list of strength of preference judgments using the computer, the list including at least four options for the user to select from to provide feedback on which stimulus is preferred and the strength of preference;
   receiving a user selection; and
   using the user selection and a genetic algorithm to rank stimuli in the population using the computer.

12. The method of claim 11, wherein the list includes at least seven options.

13. The method of claim 11, further comprising:
   selecting a second pair of stimuli from the population, the second pair including a third and fourth sound stimulus representing at least one device parameter;
   presenting the user with the third and fourth sound stimulus using the hearing assistance device;
   presenting the user with a list of strength of preference judgments using the computer, the list including at least four options for the user to select from to provide feedback on which stimulus is preferred and the strength of preference;
   receiving a second user selection;
   repeating the steps of selecting pairs of stimuli, presenting the user with sound stimuli, presenting the user with a list of judgments and receiving user selections, until all combinations of pairs of stimuli from the population are completed; and
   ranking stimuli in the population using the user selections.

14. The method of claim 13, wherein ranking stimuli in the population includes using a rating scale to assign points to the user selection based upon the strength of preference, and summing the points to provide an overall preference score for each stimuli.

15. The method of claim 11, wherein presenting a user with a list of strength of preference judgments includes presenting a user with a list including that the user prefers the first stimulus strongly better than the second stimulus, that the user prefers the first stimulus moderately better than the second stimulus, that the user prefers the first stimulus slightly better than the second stimulus, and that the user prefers the first stimulus the same as the second stimulus.

16. An apparatus for fitting a hearing assistance device for a user using a computer executing a genetic algorithm, comprising:
- a computer memory having a first population stored therein, the first population including a plurality of stimuli;
- a processor executing instructions adapted to select stimulus pairs from the first population to present to the user using the hearing assistance device, the stimulus pairs including a first stimulus and a second stimulus; and
- a computer interface adapted to present preference judgment options to the user and to accept an input of a preference judgment between stimulus pairs;
- wherein the processor executes instructions adapted to assign a score to stimuli to maximize a sum of a set of rank agreement values for each preference judgment made using a rank agreement function, and to perform a genetic algorithm using the scores to obtain a child set of stimuli, the child set used to provide parameter values during fitting of the hearing assistance device.

17. The apparatus of claim 16, wherein the preference judgment options include a list of strength of preference judgments, the list including at least four options for the user to select from to provide feedback on which of the stimuli is preferred and the strength of preference.

18. The apparatus of claim 17, wherein an option includes that the user prefers the first stimulus strongly better than the second stimulus.

19. The apparatus of claim 17, wherein an option includes that the user prefers the first stimulus moderately better than the second stimulus.

20. The apparatus of claim 17, wherein an option includes that the user prefers the first stimulus slightly better than the second stimulus.

21. The apparatus of claim 17, wherein an option includes that the user prefers the first stimulus the same as the second stimulus.

22. The apparatus of claim 17, wherein an option includes that the user prefers the second stimulus strongly better than the first stimulus.

23. The apparatus of claim 17, wherein an option includes that the user prefers the second stimulus moderately better than the first stimulus.

24. The apparatus of claim 17, wherein an option includes that the user prefers the second stimulus slightly better than the first stimulus.

25. A method of fitting a hearing assistance device for a user, comprising:
- presenting to the user using a computer stimulus pairs adapted to provide contrasting options for selection from a set of stimuli stored in the computer;
- receiving inputs from the user entered into the computer, including preference judgments of the user;
- calculating a score for each stimulus of the pair using the computer to execute a rank agreement function to maximize agreement between scores and the preference judgments;
- selecting a set of genes based on the scores, wherein the set of genes correspond to hearing assistance device parameters; and
- operating on the set of genes with a genetic algorithm using the assigned scores to obtain a child set of genes,
- wherein the child set is used to provide parameter values during fitting of the hearing assistance device, and
- wherein calculating a score for each stimulus includes assigning scores to maximize a sum of a set of rank agreement values for each preference judgment made using a rank agreement function.

26. The method of claim 25, wherein the rank agreement function includes a function of difference in scores between stimuli being compared and preference strength.

27. A method of fitting a hearing assistance device for a user, comprising:
- presenting to the user using a computer stimulus pairs adapted to provide contrasting options for selection from a set of stimuli stored in the computer;
- receiving inputs from the user entered into the computer, including preference judgments of the user;
- calculating a score for each stimulus of the pair using the computer to execute a rank agreement function to maximize agreement between scores and the preference judgments;
- selecting a set of genes based on the scores, wherein the set of genes correspond to hearing assistance device parameters; and
- operating on the set of genes with a genetic algorithm using the assigned scores to obtain a child set of genes,
- wherein the child set is used to provide parameter values during fitting of the hearing assistance device, and
- wherein the rank agreement function includes a multidimensional unconstrained nonlinear optimization function.

28. A method for fitting a hearing assistance device for a user using a computer executed process, comprising:
- selecting a first pair of stimuli from a population stored in computer memory, the first pair including a first and second sound stimulus representing at least one device parameter;
- presenting the user with the first and second sound stimulus using the hearing assistance device;
- presenting the user with a list of strength of preference judgments using the computer, the list including at least four options for the user to select from to provide feedback on which stimulus is preferred and the strength of preference;
- receiving a user selection;
- using the user selection and a genetic algorithm to rank stimuli in the population using the computer;
- selecting a second pair of stimuli from the population, the second pair including a third and fourth sound stimulus representing at least one device parameter;
- presenting the user with the third and fourth sound stimulus using the hearing assistance device;
- presenting the user with a list of strength of preference judgments using the computer, the list including at least four options for the user to select from to provide feedback on which stimulus is preferred and the strength of preference;
- receiving a second user selection;
- repeating the steps of selecting pairs of stimuli, presenting the user with sound stimuli, presenting the user with a list of judgments and receiving user selections, until all combinations of pairs of stimuli from the population are completed; and
- ranking stimuli in the population using the user selections,
- wherein ranking stimuli in the population includes using a rating scale to assign points to the user selection based upon the strength of preference, and summing the points to provide an overall preference score for each stimuli.

* * * * *

UNITED STATES PATENT AND TRADEMARK OFFICE
CERTIFICATE OF CORRECTION

PATENT NO. : 8,359,283 B2
APPLICATION NO. : 12/550768
DATED : January 22, 2013
INVENTOR(S) : Baskent et al.

It is certified that error appears in the above-identified patent and that said Letters Patent is hereby corrected as shown below:

On the Title Page

On page 2, in column 2, Item (56) under "Other Publications", line 8, delete "Proceedigs" and insert --Proceedings--, therefor On page 2, in column 2, Item (56) under "Other Publications", line 46, delete "filed" and insert --mailed--, therefor On page 2, in column 2, Item (56) under "Other Publications", line 47, delete "filed" and insert --mailed--, therefor On page 3, in column 1, Item (56) under "Other Publications", line 1-2, delete "EP 07250920" and insert --07250920.1--, therefor On page 3, in column 1, Item (56) under "Other Publications", line 8, delete "(3),Starkey" and insert --(3), Starkey--, therefor On page 3, in column 1, Item (56) under "Other Publications", line 10, delete "D," and insert --D.,--, therefor On page 3, in column 1, Item (56) under "Other Publications", line 11, delete "Hearing,(1994)" and insert --Hearing, (1994)--, therefor On page 3, in column 1, Item (56) under "Other Publications", line 12, delete "E" and insert --E.--, therefor On page 3, in column 1, Item (56) under "Other Publications", line 15, delete "S," and insert --S.,--, therefor Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 8,359,283 B2

On page 3, in column 1, Item (56) under "Other Publications", line 17, delete "S," and insert --S.,--, therefor On page 3, in column 1, Item (56) under "Other Publications", line 19, delete "S," and insert --S.,--, therefor On page 3, in column 1, Item (56) under "Other Publications", line 20, delete "3." and insert --3 pgs.--, therefor On page 3, in column 1, Item (56) under "Other Publications", line 21, delete "J," and insert --J.,--, therefor On page 3, in column 1, Item (56) under "Other Publications", line 23, delete "H," and insert --H.,--, therefor On page 3, in column 1, Item (56) under "Other Publications", line 25, after "10", insert --, --, therefor On page 3, in column 1, Item (56) under "Other Publications", line 26, delete "M," and insert --M.,--, therefor On page 3, in column 1, Item (56) under "Other Publications", line 34, delete "F," and insert --F.,--, therefor On page 3, in column 1, Item (56) under "Other Publications", line 36, delete "5." and insert --5 pgs.--, therefor On page 3, in column 1, Item (56) under "Other Publications", line 37, delete "F," and insert --F.,--, therefor On page 3, in column 1, Item (56) under "Other Publications", line 39, delete "6." and insert --6 pgs.--, therefor On page 3, in column 2, Item (56) under "Other Publications", line 1, delete "H," and insert --H.,--, therefor On page 3, in column 2, Item (56) under "Other Publications", line 5, delete "H," and insert --H.,--, therefor On page 3, in column 2, Item (56) under "Other Publications", line 6, delete "Cybernetics,(1999)" and insert --Cybernetics, (1999)--, therefor On page 3, in column 2, Item (56) under "Other Publications", line 8, delete "H," and insert --H.,--, therefor On page 3, in column 2, Item (56) under "Other Publications", line 11, delete "T," and insert --T.,--, therefor On page 3, in column 2, Item (56) under "Other Publications", line 17, delete "mailed" and insert --filed--, therefor In the Claims In column 14, line 67, in Claim 15, delete "the" and insert --is--, therefor